(12) United States Patent
Nishida et al.

(10) Patent No.: US 7,959,750 B2
(45) Date of Patent: Jun. 14, 2011

(54) APPARATUS AND METHOD FOR MANUFACTURING RESIN-IMPREGNATED CURED SHEET, AND APPARATUS AND METHOD FOR MANUFACTURING CARBONACEOUS MATERIAL SHEET

(75) Inventors: Toshihiko Nishida, Hiroshima (JP); Hidehiko Ohashi, Hiroshima (JP); Makoto Nakamura, Hiroshima (JP); Mitsuo Hamada, Hiroshima (JP); Kazushige Mihara, Hiroshima (JP)

(73) Assignee: MItsubishi Rayon Co., Ltd., Tokyo (JP)

( * ) Notice: Subject to any disclaimer, the term of this patent is extended or adjusted under 35 U.S.C. 154(b) by 656 days.

(21) Appl. No.: 11/701,405

(22) Filed: Feb. 2, 2007

(65) Prior Publication Data
US 2007/0163721 A1    Jul. 19, 2007

Related U.S. Application Data

(62) Division of application No. 10/872,519, filed on Jun. 22, 2004, now abandoned, which is a division of application No. 09/903,680, filed on Jul. 13, 2001, now abandoned.

(30) Foreign Application Priority Data

Jul. 14, 2000    (JP) .................................. 2000-214441

(51) Int. Cl.
*D04H 1/58* (2006.01)
*D01F 9/14* (2006.01)
(52) U.S. Cl. ....... 156/62.2; 156/181; 156/267; 264/29.2
(58) Field of Classification Search ................. 156/62.2, 156/181, 267, 583.5; 264/29.2, 29.5, 118, 264/120
See application file for complete search history.

(56) References Cited

U.S. PATENT DOCUMENTS 2,269,884 A    1/1942    Stocker
(Continued)

FOREIGN PATENT DOCUMENTS

EP    0 162 976 A1    12/1985
(Continued)

OTHER PUBLICATIONS

International Search Report dated Jan. 14, 2005, Application/Patent No. 01947985.6-2307-JP0106042.

*Primary Examiner* — Michael A Tolin
(74) *Attorney, Agent, or Firm* — Fitch, Even, Tabin & Flannery

(57) ABSTRACT

An object of the present invention is to provide an apparatus and a method for manufacturing a windable carbonaceous material sheet, which is obtained by continuously curing a long uncured fiber sheet which is obtained by using short fibers to make paper and which contains uncured resin to produce a resin-impregnated cured sheet, and then continuously carbonizing it, and its production process.

For the object, a long uncured fiber sheet (1a) is conveyed by conveyance means which is equipped with one rotation belt set (2) comprising a drive roll (2a), a follower roll (2b), and an endless belt (2c) which is put on and around these rolls (2a, 2b). A resin-impregnated cured sheet (1b) is produced by heating and pressurizing the uncured fiber sheet (1a) by resin curing means (3) which is arranged so as to nip the uncured fiber sheet through the endless belt (2c). Further, the resin-impregnated cured sheet is continuously conveyed in a horizontal direction, and then is carbonized by the apparatus for manufacturing a carbonaceous material sheet which is equipped with a carbonization treatment chamber for carbonizing a carbonizing material and guide rolls which are provided in the carbonization treatment chamber, so that a carbonaceous material sheet is continuously produced. Then, this is wound up. Accordingly, production efficiency is remarkably improved, and its handling property and conveying property are excellent.

5 Claims, 3 Drawing Sheets

U.S. PATENT DOCUMENTS

| | | |
|---|---|---|
| 2,461,109 A | 2/1949 | Crabtree |
| 3,223,027 A | 12/1965 | Shigenari et al. |
| 3,279,718 A * | 10/1966 | Arterton et al. ............... 242/547 |
| 3,871,290 A | 3/1975 | Verboom |
| 4,064,207 A | 12/1977 | DeCrescente et al. |
| 4,426,340 A | 1/1984 | Goller et al. |
| 4,659,425 A | 4/1987 | Eggers et al. |
| 4,670,080 A | 6/1987 | Schwarz et al. |
| 4,687,528 A | 8/1987 | Held |
| 4,759,989 A | 7/1988 | Abe et al. |
| 4,794,855 A | 1/1989 | Okajima et al. |
| 4,812,366 A | 3/1989 | Duncan et al. |
| 4,988,478 A | 1/1991 | Held |
| 5,141,583 A | 8/1992 | Held |
| 5,225,140 A | 7/1993 | Hayashikoshi et al. |
| 5,407,516 A | 4/1995 | Kaufmann et al. |
| 5,648,027 A | 7/1997 | Tajiri et al. |
| 5,726,105 A * | 3/1998 | Grasso et al. ................. 442/326 |
| 5,871,844 A | 2/1999 | Theys et al. |
| 6,071,651 A | 6/2000 | Forte et al. |
| 6,197,147 B1 * | 3/2001 | Bonsel et al. .................. 156/269 |
| 6,375,777 B1 | 4/2002 | Sjolin et al. |
| 6,536,704 B1 | 3/2003 | Rautakorpi et al. |

FOREIGN PATENT DOCUMENTS

| | | |
|---|---|---|
| EP | 0 364 297 A2 | 4/1990 |
| EP | 0 651 452 A1 | 5/1995 |
| JP | 54-148856 A | 11/1979 |
| JP | 57-148618 A | 9/1982 |
| JP | 60-122711 A | 7/1985 |
| JP | 63-062713 A | 3/1988 |
| JP | 02-106876 A | 4/1990 |
| JP | 08-002979 A | 1/1996 |
| JP | 09-157065 A | 6/1997 |
| WO | WO97/23919 A1 * | 7/1997 |

* cited by examiner

APPARATUS AND METHOD FOR MANUFACTURING RESIN-IMPREGNATED CURED SHEET, AND APPARATUS AND METHOD FOR MANUFACTURING CARBONACEOUS MATERIAL SHEET

CROSS-REFERENCED APPLICATIONS

This application is a divisional application of U.S. patent application Ser. No. 10/872,519, filed Jun. 22, 2004 now abandoned, which is a divisional application of Ser. No. 09/903,680, filed Jul. 13, 2001 now abandoned, the complete disclosures of each of the prior applications are incorporated herein by reference.

TECHNICAL FIELD

The present invention relates to an apparatus and a method for manufacturing, for example, a substrate of a flexible printed circuit board and an electrode substrate of a fuel cell. Specifically, the present invention relates to an apparatus and a method that makes it possible to continuously produce a long resin-impregnated cured sheet or a long carbonaceous material sheet.

PRIOR ART

A substrate of a printed circuit board, which comprises fiber reinforced plastics, is produced by using an organic fiber reinforced pre-preg that is obtained by impregnating matrix resin into a sheet made of para-aramid fiber and meta-aramid pulp or fusion-liquid-crystal aromatic polyester fiber and pulp thereof, for example, as described in Japanese Patent Application Laid-Open No. 2000-77803 as a conventional technology. Alternatively, there is a method of obtaining a flexible substrate by impregnating epoxy resin into a dry sheet, which is obtained by integrating a mixed web comprising aramid fiber and thermoplastic fiber such as polyester or the like by means of a hot calendar. As to the substrate of a printed circuit board, which is produced by these conventional processes, a long printed circuit board is cut at a desired dimension at a final stage of the production process and then laminated to be stored, as disclosed in Japanese Patent Application Laid-Open No. 5-24165. In addition, the term "flexible" as mentioned above means that flexibility is locally imparted to a substrate.

Further, as a porous electrode for a phosphoric acid type fuel cell, the conventional mainstream has been a porous carbon electrode, which is produced by impregnating thermosetting resin into a short carbon fiber sheet made of carbon fiber, and after curing the resin, sintering it to be carbonized.

Since the conventional substrate of a porous carbon electrode has a large thickness and fragility, many of such substrates are easy to be destructed when being bent. Further, since the conventional electrodes are bonded at intersection portions of carbon fibers at most, there are little numbers of bonded points. Therefore, electroconductivity in a thickness direction is not always high as compared with that in a direction of the fiber axis. Furthermore, in order that the efficiency of chemical-electrical energy conversion is raised by smoothing the flow of gas and water in a fuel cell, when the porocity of the substrate of the porous carbon electrode is raised, there raises a problem that the electroconductivity itself is lowered.

Then, for example, a porous carbon electrode, which is disclosed in Japanese Patent Application Laid-Open No. 1-160867, uses a combination of a self-curing type resol-based phenol resin, which is thermosettable, and a non self-curing type novolak-base phenol resin, as a resin that can be carbonized. By thus adopting two kinds of resins, only the resol-based phenol resin is cured at the resin curing, and thereafter, the novolak-base phenol resin, which has not been cured, flows between the fibers and enters the gaps of the fibers, at the carbonization. Then, the resin is carbonized, so that the conductivity of an electroconductive substrate is enhanced.

Further, for example, as to the substrate of a porous carbon electrode disclosed in Japanese Patent Application Laid-Open No. 7-142068, a carbonaceous milled fiber, which has a fiber length of 0.1 mm or less, exists in a thickness direction of the electrode substrate at a matrix portion of the porous-structural electrode substrate comprising a—carbon. Therefore, the fibers, which are arranged in the thickness direction, are mutually bonded even at portions other than the intersection portions. Accordingly, the electrode substrate having such structure improves the whole electroconductivity, in particular, the electroconductivity in the thickness direction of the electrode substrate.

On the other hand, Japanese Patent Application Laid-Open No. 8-2979 discloses a porous carbon material with grooves for a phosphoric acid type fuel cell. The carbon material can be obtained by using a sheet containing a fiber capable of being made into carbon fiber and/or a carbon fiber and a thermosetting resin which can be carbonized or graphitized to make paper, heating, pressuring and molding the sheet, then arranging it in a mold in which an uneven portion is formed with a clearance, after the arrangement, heating the sheet again to be expanded and perfectly cured, and then baking it. According to the production method of the electrode substrate, groove-shaped gas flow paths are formed with a high precision. Furthermore, it is possible to obtain a substrate, which has a light weight, with highly mechanical strength and excellent in uniformity, thermal conductivity and gas permeability.

There is a solid polymer type fuel cell to be in place of these phosphoric acid type fuel cells. Since the current density of the porous electrode for the solid polymer type fuel cell is 4 to 20 times higher than that of the electrode for the phosphoric acid type fuel cell, the feed amount of hydrogen and oxygen, and the removal amount of water that has been formed by reaction are increased. On the other hand, since the operational temperature of the solid polymer type fuel is low, which is 100° C. or so, the water that has been formed is not evaporated but flows. As a result, the feed path of the gas is choked by the water, therefore the feed path of the gas is apt to be narrow.

Accordingly, in comparison with the porous electrode for the phosphoric acid type fuel cell, the diffusion property and permeability of gas, the strength and flexibility for enduring a handling, and further, the strength for enduring the compression at the production of the electrode or at the assembling of the electrode, and the like are required for the porous electrode for the solid polymer type fuel cell.

Japanese Patent Application Laid-Open No. 9-157052 discloses a porous carbon plate for the solid polymer type fuel cell. Since the porous carbon plate disclosed in this Publication is applied to the solid polymer type fuel cell, the gas permeability in the thickness direction is enhanced in particular. According to this Publication, in order to enhance the gas permeability in the thickness direction, there is obtained a sheet made of carbon short fibers, in which the carbon short fibers are dispersed in a random direction in a substantially two dimensional plane, the sheet being impregnated with a desired amount of mixed resin in which the mix ratio of a resol-based phenol resin to a novolak-base phenol resin is 2:1 to 1:3, and heated to be carbonized.

Further, since the current density of the porous electrode for the solid polymer type fuel cell is higher than that of the porous electrode for the phosphoric acid type fuel cell, a requirement for making the solid polymer type fuel cell into a small size has been stronger. In order to realize it, it is required to make the porous electrode thinner. The thickness of the electrode of the solid polymer type fuel cell is 0.2 mm for an automobile at present time, and about 0.3 mm for a stationary cell. A porous carbon plate, which has a thickness of about 0.2 mm, is disclosed in the above-mentioned Japanese Patent Application Laid-Open No. 9-157052, but it is anticipated to make the plate further thinner in the future.

However, as described above, the substrate is cut into a short plate having a predetermined dimension at the final stage of the production process of the printed circuit board, and then, it is processed to a desired dimension in accordance with application in various instruments to be used. Further, even the porous electrode substrate has a short sheet form as described above, and the substrate is generally cut into a predetermined electrode dimension of about 15 cm×15 cm for use.

Thus, when the printed circuit board and the porous electrode substrate are produced in short sheet forms, the treatment and delivery thereof are inconvenient. Further, it cannot but being cut again into an actual size at a site of fuel cell assembly, therefore there occurs a uselessness of the material at the cutting. To avoid such inconvenience, it is preferable to wind up the printed circuit board and the electrode substrate in a roll form as a long product, in order to improve the productivity of various electronic devices using the printed circuit board or a cell using the electrode substrate.

However, since a usual printed circuit board has a high rigidity, it has been conventionally treated on the condition that it is cut into a short plate at the final step of the production process. Therefore, there has been no attempt to wind up the printed circuit board in a roll form as a long product. For the porous electrode substrate, the situation is the same, so that there has been no attempt to wind up it in a roll form because of lack of flexibility.

In particular, in case of the electrode substrate, it is not considered at all in any of the above-mentioned publications that a long electrode substrate is continuously produced. However, when a long continuous carbon electrode substrate is produced in accordance with the manufacturing method of a conventional porous carbon electrode substrate as disclosed in these patent publications, it is possible to produce a long carbon fiber sheet made of carbon short fibers and continuously imparting thermosetting resin to the long carbon fiber sheet. However, according to a general manufacturing of a porous carbon electrode substrate, the carbon fiber sheet, to which the resin is applied, is cut into a predetermined short sheet and then, is pressed with heat to be cured by means of a hot press apparatus.

In order that the curing treatment is continuously carried out to the long carbon fiber sheet, to which the thermosetting resin is applied, using a batch-type hot press apparatus, it is considered to take a so-called semi-batch-type treatment, in which dancer rolls or the like are arranged respectively at the upstream side and the downstream side of the batch-type curing apparatus, the conveyance of the sheet is intermittently stopped at every length thereof necessary for curing treatment, and the carbon fiber sheet is intermittently cured. However, since the carbon fiber sheet becomes extremely fragile after being pressed, the sheet is apt to be broken at an edge of the hot press apparatus, namely, a boundary portion between the face to be pressed and the adjacent face that has been already pressed. Therefore, it is difficult to obtain a high quality product.

The present invention is to overcome the above-mentioned problems. One object of the invention is to provide an apparatus and a method for continuously manufacturing a flexible and windable resin-impregnated cured sheet that is obtained by impregnating resin into a long fiber sheet with and curing the sheet. Another object of the invention is to provide an apparatus and a method for continuously manufacturing a flexible and windable carbonaceous material sheet that is obtained by impregnating carbonizable resin into a long fiber sheet and carbonizing the sheet.

DISCLOSURE OF THE INVENTION

According to the present invention, there is mainly provided an apparatus for manufacturing a resin-impregnated cured sheet, characterized by comprising conveyance means for conveying a long uncured fiber sheet, which is obtained by using short fibers to make paper and which contains uncured resin; and resin curing means for curing uncured resin of the uncured fiber sheet to be formed into a resin-impregnated cured sheet, wherein the conveyance means is equipped with at least one rotation belt set comprising a driving roll, a follower roll, and an endless belt to be put on and around the drive roll and the follower roll.

Since the apparatus for manufacturing the resin-impregnated cured sheet can perform a curing treatment while continuously conveying the long uncured fiber sheet, the curing can be carried out uniformly over the uncured fiber sheet in a length direction thereof. Accordingly, it is possible to produce a resin-impregnated cured sheet that has uniform quality in the length direction with a high productivity, without generating any local fragile portions or broken portions.

The resin-impregnated cured sheet, which is manufactured according to the above-mentioned apparatus, can be supplied to users in a rolled form as, for example, a printed circuit board, so that it is easy to be treated and is convenient for transport. Further, even when it is used after being cut into pieces of dimensions in accordance with various electric instruments, wasted material is little so that the production efficiency can be also improved.

Further, according to the present invention, it is preferable, in addition to the above-mentioned feature, that the apparatus further comprises a winding device in which a trimming cutter for trimming both side edges of the resin-impregnated cured sheet, a press roll for retaining a winding face pressure, and winding shafts are arranged along a conveyance path of the resin-impregnated cured sheet.

Before being winded after cured, the fiber sheet is reeled on the winding shaft after the both side edges thereof are trimmed by a trimming cutter. At the time of winding, since a peripheral face of the wounded body is pressed by a press roll with a preliminarily set pressuring force, the sheet can be continuously reeled in good order with a fixed winding density, in cooperation with the trimming.

Further, according to the present invention, it is preferable that the conveyance means is equipped with at least two rotation belt sets, which are arranged in a paired manner so as to oppose to each other via the conveyance path of the uncured fiber sheet.

Since the two rotation belt sets are arranged on and under the uncured fiber sheet, the sheet can be sandwiched at a required length by the endless belts. Therefore, a thickness of the resin-impregnated cured sheet can be more precisely controlled and the uniformity of the thickness thereof in the length direction can be also enhanced.

When the uncured resin is thermosetting resin, heating means is adopted as the resin curing means. In this case, the heating system may be conductive heating such as heating rolls, or convection heating, in which a heating area is provided, or radiant heating such as far infrared radiation or the like. However, from a viewpoint of reduction of heating loss, the conductive heating such as heating rolls or the like is rather preferable.

In addition, it is preferable to arrange a plurality of pairs of heating and pressuring rolls in the conveyance direction of the uncured fiber sheet. In that case, a pitch between each pair of the heating and pressuring rolls in the conveyance direction and a diameter of the heating and pressuring roll can be determined in consideration of a temperature change of the endless belt before and after the heating and pressuring rolls, a pressure fluctuation that is applied to the uncured fiber sheet itself, and the like.

Further, a heating temperature (temperature at the curing) and a pressure of the heating and pressing rolls can be suitably set. However, when a uncured fiber sheet which is an intermediate product of a carbonaceous material sheet is produced, it is preferable that the temperature at the curing is 350° C. or less, and the pressure is within a range of $1.5 \times 10^4$ N/m to $1.0 \times 10^5$ N/m at linear lead.

Further, as the resin curing means of the present invention, there may be provided a continuously heating liquid-pressure apparatus that nips the uncured fiber sheet and the endless belts by a fluid pressure, in place of the heating and pressuring rolls.

The pressuring fluid, which is applied to the present continuously heating liquid-pressure apparatus, is not limited to a specific one as far as it satisfies a heat resistance that does not cause any deterioration, alteration and the like at a desired temperature. Therefore, it may be appropriately determined in accordance with the desired temperature. In general, a silicon-based oil, which is excellent in heat resistance, is preferably used.

Gas can be used as the pressuring fluid, but a liquid is usually advantageous because of its high thermal conduction efficiency.

Since the continuously heating liquid-pressure apparatus according to the present invention is different from the above-mentioned heating and pressuring rolls in that it can continuously impart face pressure while the sheet passes the continuously heating liquid-pressure apparatus. Therefore, it is preferably used when a long treatment time is required. Further, in accordance with the requirement, a plurality of apparatuses may be arranged in a face direction of the fiber sheet to be treated.

Furthermore, the heating and pressuring rolls may be provided in combination with it.

According to a preferable embodiment of the continuously heating liquid pressure apparatus, in order that the fiber sheet to be treated is continuously and simultaneously heated and pressurized through the endless belt, the pressuring fluid with high temperature is introduced. The pressuring fluid with high temperature is recycled, but occasionally is utilized by being enclosed in the apparatus.

There is a preferable example of the continuously heating liquid pressure apparatus, which is a "continuously pressuring apparatus" that is manufactured and sold by Mitsubishi Rayon Engineering Co., Ltd. The detail is disclosed in, for example, Japanese Patent Publications No. 3-51205, No. 2-62371, and No. 2-62370.

Further, it is preferable that the resin curing means is equipped with at least a preheating section and a heating and pressuring section.

When the thermosetting resin is preliminarily softened at the preheating section, the thickness of the resin-impregnated cured sheet can be controlled well at the heating and pressuring section which follows the preheating section. At this time, it is preferable that the temperature at the preheating section is not less than the temperature at which the viscosity of the thermosetting resin becomes lowest. Further, it is preferable that the temperature at the heating and pressuring section is higher than the temperature at the preheating section by 50° C. or more. Thus, the thermosetting resin can be sufficiently cured.

Further, the present invention includes a method for manufacturing a resin-impregnated cured sheet by means of the above-mentioned apparatus for manufacturing the resin-impregnated cured sheet, wherein the uncured resin of the long uncured fiber sheet is cured, the long cured fiber sheet is continuously produced and then wound up.

According to the method of the invention, the fiber-made sheet, which is obtained by using short fibers to make paper, may preferably contains a carbon short fiber and an organic polymer-based binder.

The short fibers of the fiber sheet, which is obtained by using short fibers to make paper, may be various synthetic fibers such as polyacrylonitrile-based fibers, polyester-based fibers, polyvinyl alcohol-based fibers or the like, or carbon fibers. In addition to these fibers, glass fibers, aramid fibers or ceramic-based fibers may be used for reinforcement.

The uncured fiber sheet is obtained by using these short fibers added with organic polymer-based binders to make paper, and then impregnating the obtained fiber sheet with the uncured resin and drying it. As the uncured resin, it is preferable to use the one that has agglomerating property or flowability at normal temperature.

The carbonaceous material sheet is obtained by carbonizing the resin-impregnated cured sheet. As the carbonization treatment apparatus, a burning furnace for carbon fibers can be used. There are a horizontal type burning furnace for transferring an object to be treated in a horizontal direction and a vertical type burning furnace for transferring an object to be treated in a vertical direction. When the resin-impregnated cured sheet is carbonized, it is possible to use a vertical type burning furnace. A vertical type burning furnace has such an advantageous point that guide rolls do not need to be provided. However, it is preferable to adopt a horizontal type burning furnace in consideration of a sealing property of atmosphere gas, a handling property at abnormality or the like.

Accordingly, the present invention provides an apparatus for manufacturing a carbonaceous material sheet by carbonizing a cured sheet impregnated with resin, which is produced by curing a long uncured fiber sheet which is obtained by using short fibers to make paper and which contains uncured resin. The apparatus for manufacturing the carbonaceous material sheet is mainly characterized by comprising a carbonization treatment chamber for continuously transferring the resin-impregnated cured sheet in a horizontal direction and carbonizing it, and guide rolls which are arranged in the same carbonization treatment chamber.

As the guide roll, it is preferable to employ a round bar or a round pipe made of graphite. Even if it is such a simple structure that both ends of each roll are supported by a roll supporting stand made of graphite, the roll can easily rotate because of the self-lubricating property of the graphite itself. In addition, when a plurality of guide rolls are disposed, the roll pitch can be suitably determined in accordance with the weight of a curing paper impregnated with resin and the tensile force at the carbonization treatment.

When the guide rolls are not provided in the carbonization treatment chamber, the resin-impregnated cured sheet contacts with a bottom face of the carbonization treatment chamber due to its self weight, which causes a crack or a fragment. As a result, the quality of the carbonaceous material sheet which is obtained by the carbonization treatment is lowered.

The obtained long carbonaceous material sheet can be cut into a predetermined length as required as, for example, a porous carbon electrode substrate, but the curing and the carbonization are continuously carried out as described above, so that the obtained carbonaceous material sheet has uniform and adequate flexibility in the length direction. Therefore, it can be wound up in a roll form.

Thus, It is preferable that the apparatus of the present invention comprises a winding device in which a trimming cutter for trimming the both side edges of the carbonaceous material sheet, a press roll for retaining the winding face pressure, and a winding shaft are arranged in order along the running path of the carbonaceous material sheet. As the winding device, a biaxial turret winding device, by which winding bobbins can be easily switched, is preferable for improving productivity.

Further, according to the present invention, there is mainly provided a method for manufacturing a carbonaceous material sheet, characterized by including: continuously producing a long cured fiber sheet by curing uncured resin of the long uncured fiber sheet by using an apparatus for manufacturing a resin-impregnated cured sheet, comprising conveyance means for conveying a long uncured fiber sheet which is obtained by using short fibers to make paper and which contains uncured resin and resin curing means for curing the resin of the uncured fiber sheet, wherein the conveyance means is equipped with at least one rotation belt set comprising a drive roll, a follower, and an endless belt which is put on and around the drive roll and the follower roll; and continuously producing a carbonaceous material sheet by carbonizing the long resin-impregnated cured sheet by means of the above-mentioned carbonization apparatus; and then winding up the carbonaceous material sheet.

In order to impart an adequate flexibility to the carbonaceous material sheet so that it can be wound up by a roll having an outer diameter of 75 mm or more, it is preferable that the sheet has a thickness of 0.05 to 0.5 mm, a bulk density of 0.35 to 0.8 g/cm², and a bending strength of 45 MPa or more. It is further preferable that as a short fiber, extremely fine short fibers, each of which has an average diameter of less than 5 µm and a fiber length of 3 to 10 mm, are contained at 50% or more of the total weight of fibers.

The short fibers of the fiber sheet which is obtained by using short fibers to make paper may be, besides carbon fibers, organic polymer fibers such as polyarylonitrile-based, polyvinylalcohol, or polyester-based. In addition that, glass fibers, aramid fibers, or ceramic-based fibers can be further used for reinforcement.

As the uncured resin, a resin which has adherence property or flowability at normal temperature is preferable. In particular, when the carbonaceous material sheet is produced, a phenol resin, a furan resin or the like that remains as an electroconductive substance after the carbonization, is preferably used as the uncured resin. The concentration of the resin is preferably from 5% by weight or more to 70% by weight or less.

Further, according to the present invention, it is preferable that the fiber-made sheet, which is obtained by using short fibers to make paper, contains carbon short fibers and organic polymer-based binders. Thus, when the carbon short fibers are being made, a strength of the fiber-made sheet can be secured.

The average diameter of the carbon short fiber is preferably less than 5 µm. Thus, smoothness of the carbonaceous material sheet and reduction of electric resistance can be attained. Furthermore, the length of the fiber is preferably 3 mm or more and 10 mm or less from a viewpoint of a dispersion property of the papering.

Further, it is preferable that the carbonization yield of the organic polymer-based binder is 40% by weight or less. Thus, the gas permeability of the carbonaceous material sheet can be secured. As the organic polymer-based binder, for example, a pulp article or a short fiber of polyvinylalcohol is preferable. The content rate of the organic polymer-based binders with respect to the fiber-made sheet is preferably 5% by weight or more and 40% by weight or less.

Further, according to the present invention, it is preferable to produce the resin-impregnated cured sheet by preliminarily heating a fiber sheet which is impregnated with the uncured resin and then heating and pressuring it. As mentioned above, the thickness of the resin-impregnated cured sheet can be well controlled by softening thermosetting resin due to the preheating and by the successive heating and pressuring.

Further, it is preferable that the temperature at the heating and pressuring is higher than the preheating temperature by 50° C. or more. Thereby, the thermosetting resin can be sufficiently cured.

In this case, it is more preferable that the preheating temperature is not less than a temperature at which the viscosity of the thermosetting resin becomes the lowest.

BEST MODE FOR CARRYING OUT THE INVENTION

The best mode for carrying out the present invention is specifically illustrated below with reference to the drawings.

Figure 1:
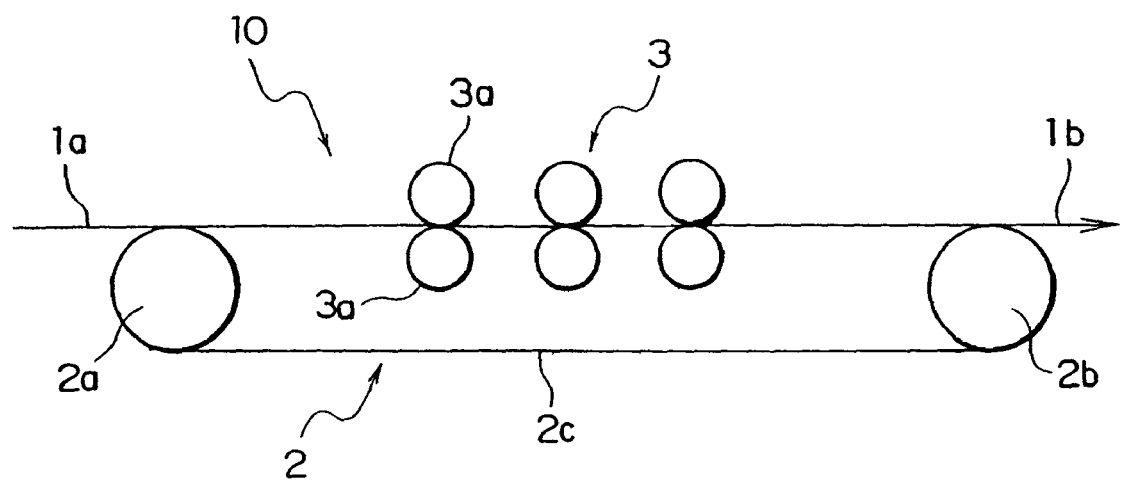
FIG. 1 is a schematic view of an apparatus for manufacturing a preferred resin-impregnated cured sheet according to the present invention.

FIG. 1 schematically shows an apparatus 10 for manufacturing a resin-impregnated cured sheet, which is a preferable first embodiment of the present invention. According to the present embodiment, illustrated is a case in which a resin-impregnated cured sheet which is impregnated with carbonizable thermosetting resin and cured is produced, the resin-impregnated cured sheet being an intermediate product in producing a carbonaceous material sheet. However, the apparatus for manufacturing the resin-impregnated cured sheet of the present invention should not be limited to the one for manufacturing the resin-impregnated cured sheet which is an intermediate product in producing a carbonaceous material sheet, but it can be also used for producing a printed circuit board or the like.

The apparatus 10 for manufacturing the resin-impregnated cured sheet serves to continuously heat an uncured fiber sheet 1a in which uncured thermosetting resin is imparted to a long fiber-made sheet which is obtained by using short fibers to make paper so that the thermosetting resin is cured and continuously produce a long resin-impregnated cured sheet 1b.

The apparatus 10 for manufacturing the resin-impregnated cured sheet is equipped with conveyance means for continuously conveying a long sheet article 1 (the uncured fiber sheet 1a, the resin-impregnated cured sheet 1b). In the conveyance means, there are arranged a drive roll 2a at an upstream side in a conveying direction, an follower roll 2b at a downstream side in the same conveying direction, and at least one rotation belt set 2 which is constituted by an endless belt 2c being put on and around the drive roll 2a and the follower roll 2b. An upper face of the endless belt 2c is a conveying face of the sheet articles 1a and 1b. In the present embodiment, the drive roll 2a is arranged at the upstream side in the conveying direction and the follower roll 2b is arranged at the downstream side in the conveying direction, but the drive roll 2a and the follower roll 2b may be inversely arranged.

The apparatus 10 for manufacturing the resin-impregnated cured sheet is further equipped with resin curing means 3 for curing the thermosetting resin of the uncured fiber sheet 1a and molding it into the resin-impregnated cured sheet 1b. As shown in FIG. 1, as the resin curing means 3, three pairs of upper and lower heating and pressuring rolls 3a, which are respectively disposed on the sheet article 1 and under the endless belt 2c, are arranged in the conveying direction of the sheet article 1 so as to nip the sheet article 1 with the endless belt 2c. The heating and pressuring rolls 3a are supported at both ends or multi-points thereof. For a heat source of the heating and pressuring rolls 3a, electricity, heating medium or the like can be appropriately adopted.

A diameter of each of the heating and pressuring rolls 3a and a pitch of the three pairs of the heating and pressuring rolls 3a are appropriately determined considering a temperature change of the endless belt before and after the heating and pressuring rolls 3a, a pressure fluctuation which the sheet article 1 itself receives or the like. Further, the temperature and the pressure of a press of the heating and pressuring rolls are suitably set in accordance with the thermosetting resin material(s). For example, when the resin-impregnated cured sheet 1b, which is an intermediate product in producing the carbonaceous material sheet, is produced, it is preferable that the temperature range at curing the carbonizable resin is 350° C. or less, and the pressure is $1.5 \times 10^4$ N/m or more and $1.0 \times 10^5$ N/m or less at linear load.

Figure 2:
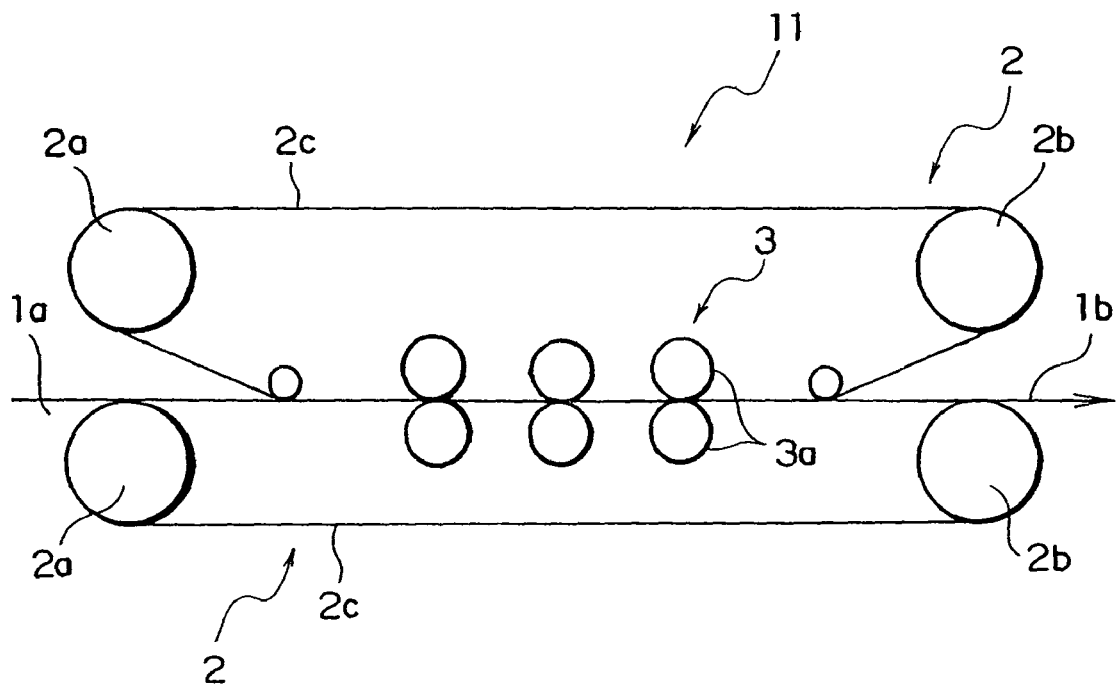
FIG. 2 is a schematic view of an apparatus for manufacturing another preferred resin-impregnated cured sheet according to the present invention.

FIG. 2 schematically shows an apparatus 11 for manufacturing a resin-impregnated cured sheet according to a modified example of the above-mentioned preferable first embodiment according to the present invention. The same reference numerals are imparted to the same structures as the above-mentioned embodiment, so the detailed description is omitted.

In the apparatus 11 for manufacturing the resin-impregnated cured sheet, a pair of upper and lower rotation belt sets 2, each of which is constituted of a drive roll 2a, a follower roll 2b and an endless belt 2c which are put on and around the drive roll 2a and the follower roll 2b, are arranged so as to sandwich the sheet article 1a, 1b which are being conveyed. That is, the sheet article 1a, 1b are conveyed while being sandwiched by the respective endless belts 2c of the upper and lower rotation belt sets 2.

In the present apparatus 11, two heating and pressuring rolls 3a are arranged so as to nip the sheet article 1 which is sandwiched by the upper and lower endless belts 2c, from the outside of the endless belt 2c.

Thus, because the two rotation belt sets 2 are arranged on and under the sheet article 1, the sheet article 1 is sandwiched by the endless belts 2c at not only the installation positions of the heating and pressuring rolls 3a but also at a required length. Therefore, a thickness of the obtained resin-impregnated cured sheet 1b can be accurately controlled so that the uniformity of the thickness in the longitudinal direction can be enhanced.

Figure 3:
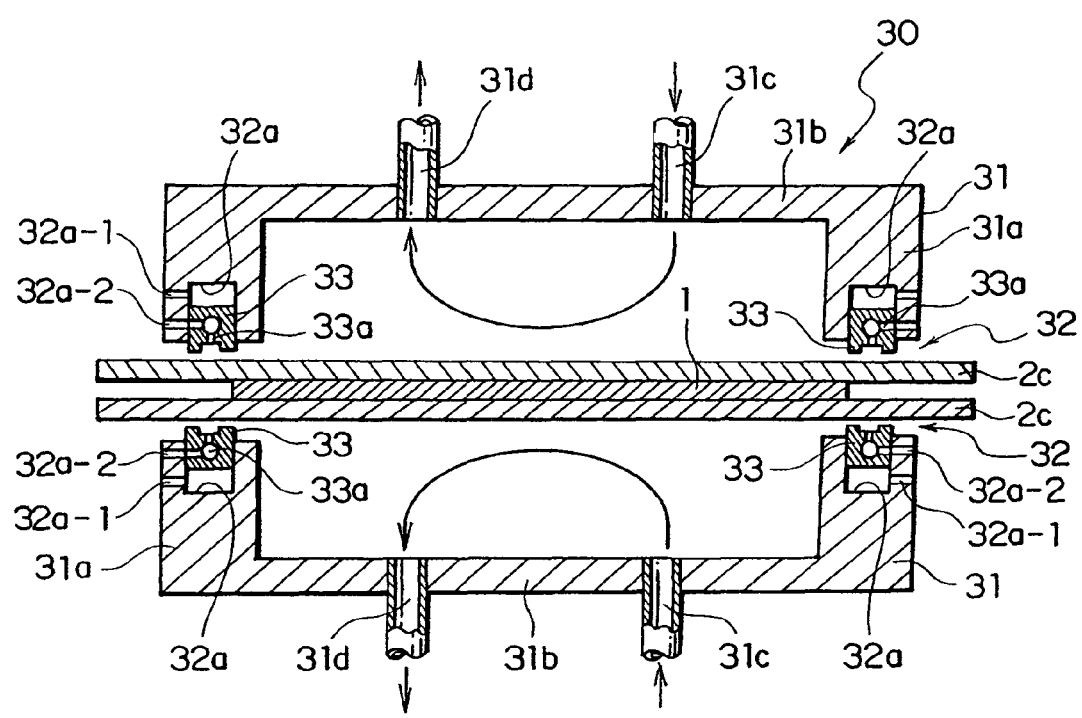
FIG. 3 is a schematic sectional view of a heating and pressuring apparatus in an apparatus for manufacturing another preferable resin-impregnated cured sheet according to the present invention.

FIG. 3 shows another preferable embodiment of the resin curing means for continuously heating and pressuring a thermosetting resin which is impregnated in an uncured fiber sheet. As the detail of the resin curing means, for example, a "continuously pressuring apparatus", which is disclosed in Japanese Patent Publication No. 2-62371 and which is also manufactured and sold by Mitsubishi Rayon Engineering Co., Ltd., can be applied, as already described. The continuously heating and pressuring device 30 as the resin curing means nips the uncured fiber sheet 1a and the endless belt 2c by a fluid having high temperature and high pressure to heat and pressurize it.

The continuously heating and pressuring device 30 as illustrated is equipped with metal box bodies 31, each of which has front, back and lateral side wall portions 31a and an opening face facing a rear face of each of the pair of upper and lower endless belts 2c. At a bottom portion 31b of the metal box body 31, there is formed an introduction port 31c which introduces a heating fluid having high temperature and high pressure from outside into a pressuring space between the metal box body 31 and the rear face of the endless belt 2c, and a discharge port 31d for discharging the heating fluid to outside.

Further, the metal box body 31 has a seal portion 32 at a continuous end face of an opening side of all the side wall portions 31a. The seal part 32 is equipped with a sliding-member-fitting groove 32a which is continuously formed along the end face of the opening side of the side wall portions 31a, and a sliding member 33 which is slidably fit into the sliding-member-fitting groove 32a. A suction path 32a-1 for fluid for damper, which lowers the pressure of a space portion between the bottom face of the sliding-member-fitting groove 32a and an fitting end face of the sliding member 33, is formed at the side wall portions 31a of the metal box body. Springs may be provided at the space portion in place of the suction of the fluid for damper. In this case, the suction path 32a-1, a suction source which is not shown here, supply pipes for the purpose and the like can be excluded.

Further, in the sliding member 33, formed is a fluid-for-seal path 33a, which communicates between the end face opposing to the endless belt 2c and the fit face with the sliding-member-fitting groove 32a and which opens in a slit form at the end face opposing to the endless belt 2c. A fluid-for-seal introducing path 32a-2 for introducing the fluid for seal from outside is formed at the corresponding part of the sliding-member-fitting groove 32a which opposes to the introducing side end portion of the fluid-for-seal path 33a. The metal box body 31 is fixedly supported by a frame body of the apparatus, which is not shown here.

The pressuring fluid having high temperature, which is applied to the present apparatus, should not be limited to a specific one as far as it has such heat resistance that does not generate deterioration, change of quality or the like at a desired temperature. Therefore, it can be appropriately selected in accordance with the curing temperature of resin. In general, silicon-based oil, which is good in heat resistance, is used. Gas can be used as the pressuring fluid, but a liquid is usually advantageous because of its high heat conductance efficiency.

The fluid having high temperature is introduced into the inner space of the metal box body 31 from the introduction port 31c of the metal box body 31, and discharged to outside from the discharge port 31d. In the example as illustrated, the high pressured fluid which is discharged from a flow pump not shown here, and is provided at the outside, is heated to a desired temperature by a heating apparatus not shown here. Then, the pressured fluid having high temperature is introduced into the inside of the metal box body 31, discharged to outside through the discharge port 31d, and returned back to the fluid pump. In the present invention, the heating and pressuring fluid can be also sealed in the metal box body 31 instead of being circulated. In this case, it is required to provide the metal box body 31 with a heating apparatus having a control mechanism for heating temperature.

When the pressured fluid having high temperature is introduced into the inner space of the metal box body 31, at the same time, the fluid for seal is simultaneously introduced from the above-mentioned fluid-for-seal introducing path 32a-2 through the fluid-for-seal path 33a of the sliding member 33 and gushed at high pressure from the end face of the sliding member 33 opposing to the endless belt 2c. The pressured fluid having high temperature introduced into the inner space of the metal box body 31 is prevented from being leaked out to the outside of the metal box body 31, owing to the gushing of the fluid for seal.

Thus, since the heating and pressuring fluid is introduced into the inner space of the metal box body 31, the uncured fiber sheet 1a which is being conveyed via the endless belt 2c is continuously and uniformly heated and pressurized simultaneously by the heating and pressuring fluid through the endless belt 2c. As a result, the thermosetting resin is cured, and the resin-impregnated cured sheet 1b having uniform thickness is continuously produced. At the curing treatment, the above-mentioned sliding member 33 which is slidingly fit into the sliding-member-fitting groove 32a formed in the metal box body 31 always makes a slight gap with respect to the endless belt 2c by combination of the damper function between the sliding-member-fitting groove 32a and the sliding member 33 and the gushing of the fluid for seal. Therefore, since the sliding member 33 does not slide in contact with the rear face of the endless belt 2c, the endless belt 2c is prevented from being damaged.

In particular, the continuously heating and pressuring device 30 according to the present embodiment is different from the heating and pressuring rolls 3a in the embodiment shown in FIG. 1 in that the sheet article 1 is only pressurized by the fluid pressure while passing through the device 30 so that the device can continuously impart a face pressure. Therefore, any mechanical sliding action does not act on the surface of the endless belt 2c, and moreover, it is preferable when the treatment time is long. Furthermore, if required, a plurality of pairs of devices can be arranged in the conveying direction of the sheet article or the width direction thereof. Further, the above-mentioned heating and pressuring rolls 3a can be used in combination with the present embodiment.

As described above, since the apparatus 10 for manufacturing the resin-impregnated cured sheet according to the present invention can simultaneously heat and pressurize the long sheet article 1 while continuously conveying it, the long sheet article 1 can be uniformly heated and pressurized in the length direction thereof. As a result, the resin-impregnated cured sheet 1b having uniform quality in the length direction can be produced with a high productivity, without generating any fragment, any local fragile portion or the like.

Figure 4:
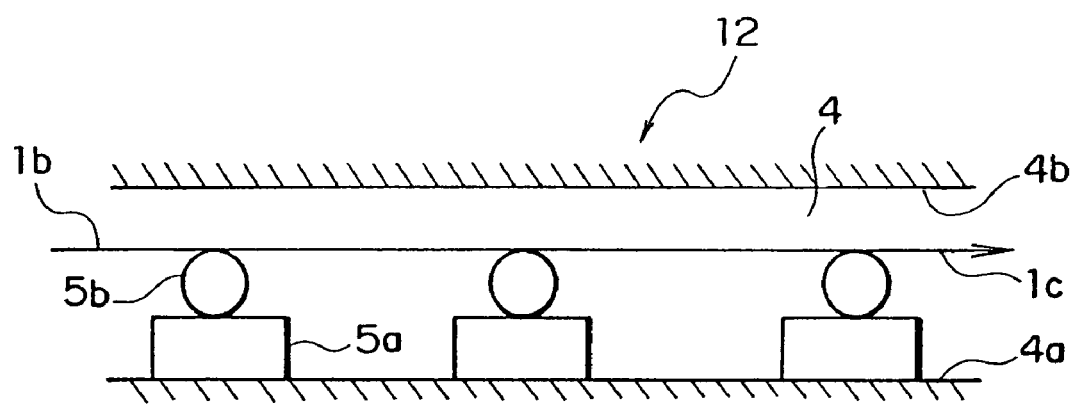
FIG. 4 is a schematic view of an apparatus for manufacturing a preferred carbonaceous material sheet according to the present invention.

FIG. 4 schematically shows an apparatus 20 for manufacturing a carbonaceous material sheet, which is a second embodiment of the present invention.

The apparatus 20 for manufacturing the carbonaceous material sheet is the one that carbonizes the resin of the long resin-impregnated cured sheet 1b and continuously produces a carbonaceous material sheet 1c.

The apparatus 20 for manufacturing the carbonaceous material sheet employs a horizontal baking furnace which conveys a sheet article (the long resin-impregnated cured sheet 1b, the carbonaceous material sheet 1c) in a horizontal direction and carbonizes it. A plurality of guide-roll-supporting stands 5a are disposed with a constant interval on a bottom wall 4a of a carbonization treatment chamber 4 in the horizontal baking furnace, and guide rolls 5b are supported on the guide-roll-supporting stands 5a at both ends or a plurality of points. The sheet article 1b, 1c is conveyed in a horizontal direction on an upper face of a plurality of the guide rolls 5b. The reference numeral 4b in the Figure shows a ceiling plate of the carbonization treatment chamber.

The guide roll 5b has a simple structure in which both ends of a round bar made of graphite or a round pipe are only supported by the supporting stands 5a made of graphite. The guide roll 5b can be easily rotated because of the self lubricity of the graphite itself.

Further, a pitch of the plurality of the guide rolls 5b can be suitably determined in accordance with a weight and a tensile force of the sheet article 1b, 1c at the time of the carbonization treatment such that the sheet article 1b, 1c do not contact with the bottom wall 4a of the carbonization treatment chamber 4 and do not rub it. Further, the temperature in the carbonization treatment chamber 4 is set to be at 100° C. or more when the carbonaceous material sheet 1c is produced.

Since the guide rolls 5b are provided in the carbonization treatment chamber 4, the resin-impregnated cured sheet 1b and the carbonaceous material sheet 1c can run steadily at a predetermined height over the full length of the treatment chamber 4. As a result, the resin-impregnated cured sheet 1b and the carbonaceous material sheet 1c are prevented from contacting with the bottom wall 4a of the carbonization treatment chamber 4 by its own weight to cause any inductive factors for a crack or a fragment. Therefore, the carbonaceous material sheet 1c with good quality can be produced.

Figure 5:
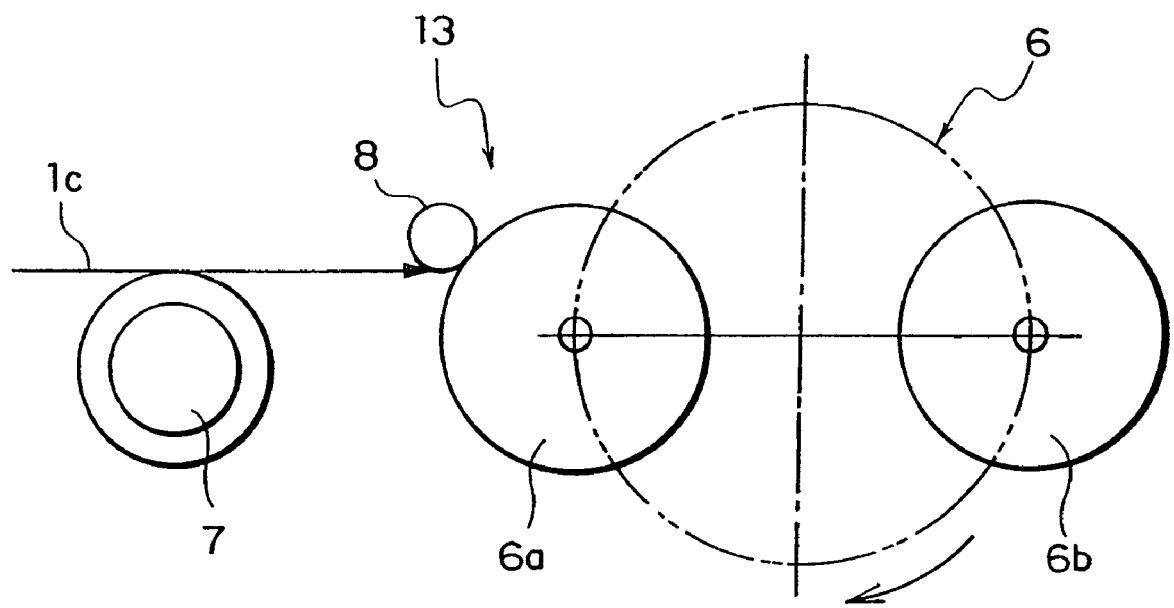
FIG. 5 is a schematic view of a winding device of the carbonaceous material sheet according to the present invention.

FIG. 5 schematically shows one example of a preferable winding device 13 according to the present invention.

In a winding section of the winding device 13, disposed is a double-axis-turret winder 6, which is equipped with a winding bobbin 6a under winding up and stand-by bobbins 6b.

In a winding section of the winding device 13, disposed is a double-axis-turret winder 6, which is equipped with a winding bobbin 6a under winding up and standing by bobbins 6b.

The carbonaceous material sheet 1c obtained after being finished with the carbonization treatment is cut at the both ends in the width direction thereof by the trimming cutter 7 so that the end faces are made even, and then is wound up on the winding bobbin 6a in a state that the winding face pressure is kept constant by the press roll 8.

The present invention will be specifically described below with reference to Examples and Comparative Examples.

The same articles as mentioned below were adopted for a fiber-made sheet and thermosetting resin in Examples and Comparative Examples below.

(Fiber-made Sheet)
Sheet article made of carbon short fibers:
    width=350 mm, thickness=0.5 mm
Average diameter of carbon short fiber: 4 μm
Average fiber length of carbon short fiber: 3 mm
Binder: PVA short fiber, carbon fiber ratio containing 15% by weight
(Thermosetting Resin)
The above-mentioned fiber-made sheet was immersed in a methanol solution of 20% by mass of a phenol resin (PHENOLITE J-325; manufactured by Dai Nippon Ink Chemicals Co., Ltd.), and 120 weight of it was adhered with respect to 100 weight of carbon fibers.

EXAMPLE 1

The apparatus for manufacturing a resin-impregnated cured sheet as shown in FIG. 2 was employed, in which two upper and lower rotation belt sets 2 were set so as to sandwich the conveyance path of a sheet article and in which 6 pairs of heating and pressuring rolls 3a were arranged in the conveyance direction with a constant interval. All of the heating and pressuring rolls 3a were set to have a diameter of 160 mm, and the pitch of the pair of the heating and pressuring rolls 3a was set to be 220 mm in the conveyance direction of the sheet article. The temperature of the heating and pressuring rolls 3a was set at 300° C., the nip pressure condition was $5 \times 10^4$ N/m, the residential time from the first pair of the heating and pressuring rolls to the sixth pair of the heating and pressuring rolls was set to be 2 minutes, and the curing treatment was continuously carried out at a treatment speed of 0.66 m/min.

Then, the apparatus for manufacturing a carbonaceous material sheet as shown in FIG. 4 was used, in which a horizontal baking furnace having the guide rolls 5b for the resin-impregnated cured sheet inside the carbonization treatment chamber 4 is adopted, so that carbonization treatment was carried out. The guide rolls 5b were set to have a diameter of 12 mm, and the pitch of the guide rolls was set to be 30 mm in the conveyance direction of the sheet article. The maximum temperature of the inside of the treatment chamber 4 was set to at 2000° C., and the residential time of the treatment chamber 4 was set to be 10 minutes. After the continuous carbonization treatment, the obtained carbonaceous material sheet was wound up in a roll form by the winding device shown in FIG. 5.

The obtained carbonaceous material sheet had no problem of a crack, a fragment or the like, and was a high quality sheet excellent in its handling property with a high bending strength. Further, a long carbonaceous material sheet can be continuously produced, so that productivity is also high.

EXAMPLE 2

An apparatus for manufacturing a resin-impregnated cured sheet, which was equipped with a preheating section, heating and pressuring rolls, and two sets of endless belts, was used. Hot wind of 200° C. was flown into the preheating section, such that the belt temperature was set at 135° C. Further, the press was carried out by the successive first heating and pressuring roll at 300° C. and under a line pressure of $6.6 \times 10^4$ N/m, so that the curing treatment was continuously carried out.

Then, the carbonization treatment was carried out and the carbonaceous material sheet obtained was wound up in a roll form in the same manner as in Example 1.

The obtained carbonaceous material sheet had no problem of a crack, a fragment or the like, and was excellent in its handling property with a bending strength of 82 Mpa, so that it had a good quality. Further, it was verified that productivity is also high since a long carbonaceous material sheet can be continuously produced.

EXAMPLE 3

The curing treatment was continuously carried out in the same condition as in Example 1 in the apparatus for manufacturing the resin-impregnated cured sheet of Example 1, except that the heating and pressuring device shown in FIG. 3 was used as the resin curing means in place of the heating and pressuring rolls, the nip pressure was set to be $5 \times 10^4$ N/m², and the residential time in the device was set to be 2 minutes.

Then, carbonization treatment was carried out and the carbonaceous material sheet obtained was wound up in a roll form in the same manner as in Example 1.

The obtained carbonaceous material sheet had smooth surface and uniform thickness, had no crack, fragment or the like, and was excellent in its handling property with a bending strength of 85 Mpa. Thus, it has a good quality. Further, since a long carbonaceous material sheet can be continuously produced, productivity is also extremely high.

COMPARATIVE EXAMPLE 1

A long carbonaceous material sheet was produced in a condition similar to Example 1, except that a hot press was adopted as the apparatus for manufacturing the resin-impregnated cured sheet, and the curing treatment was carried out on the long uncured fiber sheet by semi-batch-type.

The production was carried out by changing various conditions concerning the treatment temperature, pressure, and treatment time by the hot press. However, under any of the conditions, the carbonaceous material sheet as a final product produced by the carbonization treatment was very fragile at a press boundary line, its quality was lowered, the flexibility was deficient, and the handling property was poor.

COMPARATIVE EXAMPLE 2

A long carbonaceous material sheet was produced in a condition similar to Example 1, except that the carbonization was carried out using a horizontal baking furnace in which no guide rolls 5b were provided.

The obtained carbonaceous material sheet obtained had naps, which appeared to be generated by being rubbed with the bottom wall of the baking furnace, on the surface thereof. Further, fragments occur at the end portions of the carbonaceous material sheet in the width direction thereof orthogonal to the conveyance direction, so that its quality and product yield were low.

As described above, since the apparatus for manufacturing a resin-impregnated cured sheet of the present invention is applied, the heating and pressuring can be continuously and simultaneously carried out with respect to a long uncured fiber sheet which is continuously conveyed. Therefore, the productivity and the handling property of the carbonaceous material sheet can be remarkably improved as compared with a conventional batch-type curing process. Further, it is possible to produce a carbonaceous material sheet having a good quality, without generating any crack or fragment in the carbonaceous material sheet, by using the apparatus for manufacturing a carbonaceous material sheet of the present invention. Since such a long carbonaceous material sheet can be continuously produced, the productivity can be improved, and the long carbonaceous material sheet with a high quality can be supplied in a rolled form.

The invention claimed is:

1. A method for manufacturing a carbon electrode substrate for a fuel cell from a long uncured fiber sheet which is obtained by using short fibers to make paper and which contains uncured resin, using an apparatus adapted for such manufacture comprising:

conveyance means for conveying a long uncured fiber sheet which contains uncured resin;

resin curing means for curing the uncured resin of the uncured fiber sheet, the resin curing means including a continuously heating and pressuring device having an inner space thereof;

a burning furnace for carbonizing a resin-impregnated cured sheet whose resin is cured by using the resin curing means; and a winding device for winding up the carbonized sheet which is carbonized in the burning furnace;

the conveyance means including one upper and lower rotation belt set each comprising a drive roll, a follower roll, and an endless belt which is put on and around the drive roll and follower roll, the winding device including a trimming cutter for trimming both side edges of the carbonized sheet, a press roll for retaining a winding face pressure, and a winding shaft that are arranged in order along a running path of the carbonized sheet;

said method including steps of:

positioning a portion of the upper endless belt above the uncured fiber sheet and positioning a portion of the lower endless belt below the uncured fiber sheet such that the sheet is disposed between the positions of the upper and lower endless belts;

advancing the portions of the endless belts and the uncured fiber sheet disposed therebetween into the inner space of the continuous heating and pressurization device;

curing the uncured fiber sheet by heating and compressing the uncured fiber sheet through the endless belts to produce a cured fiber sheet, said heating being at a temperature of about 350 degrees Celsius or less and at a pressure between about $1.5 \times 10^4$ N/m and about $1.0 \times 10^5$ N/m linear load;

continuously producing a long cured fiber sheet by curing the uncured resin of the long uncured fiber sheet;

producing a long porous electrode substrate for a fuel cell by supplying the cured fiber sheet whose uncured resin is cured into the burning furnace and continuously carbonizing the cured fiber sheet; and continuously winding up the porous electrode substrate for a fuel cell about the axis of the winding shaft of the winding device.

2. A method for manufacturing a porous electrode substrate for a fuel cell according to claim 1, wherein the uncured fiber sheet, which is obtained by using short fibers to make papers contains carbon short fibers and an organic polymer-based binder.

3. A method for manufacturing a porous electrode substrate for a fuel cell according to claim 1, wherein the conveyance means are arranged in a paired manner so as to sandwich a conveyance path of the uncured fiber sheet.

4. A method for manufacturing a porous electrode substrate for a fuel cell according to claim 1, wherein said resin curing means includes a pair of heating and pressuring rolls arranged for nipping said uncured fiber sheet through said endless belts, whereby said method includes nipping said uncured fiber sheet through said endless belts using the pair of heating and pressuring rolls.

5. A method for manufacturing a porous electrode substrate for a fuel cell according to claim 1, wherein the porous electrode substrate for a fuel cell includes porous material for a solid polymer type fuel cell.

* * * * *